US008826644B2

(12) United States Patent
Ponnathpur

(10) Patent No.: US 8,826,644 B2
(45) Date of Patent: Sep. 9, 2014

(54) ENGINE AND EXHAUST AFTERTREATMENT CONTROL

(75) Inventor: Chetan Ponnathpur, Columbus, IN (US)

(73) Assignee: Cummins Intellectual Properties, Inc., Minneapolis, MN (US)

(*) Notice: Subject to any disclaimer, the term of this patent is extended or adjusted under 35 U.S.C. 154(b) by 373 days.

(21) Appl. No.: 12/983,776

(22) Filed: Jan. 3, 2011

(65) Prior Publication Data

US 2011/0162350 A1   Jul. 7, 2011

Related U.S. Application Data

(60) Provisional application No. 61/291,859, filed on Jan. 1, 2010.

(51) Int. Cl.
F01N 3/00 (2006.01)
F01N 3/20 (2006.01)
F01N 11/00 (2006.01)
F01N 9/00 (2006.01)

(52) U.S. Cl.
CPC ............... F01N 3/2066 (2013.01); Y02C 20/10 (2013.01); F01N 11/00 (2013.01); F01N 9/00 (2013.01); Y02T 10/47 (2013.01); F01N 2570/14 (2013.01); Y02T 10/24 (2013.01)
USPC .................... 60/285; 60/274; 60/286; 60/301

(58) Field of Classification Search
CPC ......... F01N 3/2066; F01N 9/00; F01N 11/00; F01N 2570/14; Y02T 10/24; Y02T 10/47; Y02C 20/10
USPC .................................................. 60/274–324
See application file for complete search history.

(56) References Cited

U.S. PATENT DOCUMENTS 5,924,280 A   7/1999 Tarabulski
6,415,602 B1   7/2002 Patchett et al.
(Continued)

FOREIGN PATENT DOCUMENTS

CN   101377143 A   3/2009

OTHER PUBLICATIONS

Notification of Transmittal of the International Search Report and the Written Opinion of the International Searching Authority, or the Declaration with mailing date of Sep. 23, 2011; International Application No. PCT/US2011/020051.

(Continued)

Primary Examiner — Jesse Bogue
(74) Attorney, Agent, or Firm — Foley & Lardner LLP

(57) ABSTRACT

A method of controlling an internal combustion engine and exhaust system having an SCR, and engine and exhaust system including an SCR, described herein, monitors, in real time, NOx conversion efficiency of an exhaust flow output by the internal combustion engine through the SCR. A determination is made as to whether the monitored NOx conversion efficiency exceeds a predetermined target conversion efficiency, such as a target based on a predetermined allowable amount of NOx emission. While the monitored NOx conversion efficiency exceeds the predetermined amount, the NOx concentration level in the exhaust flow is increased by an amount based on the difference in the monitored conversion efficiency and the predetermined target conversion efficiency. Another method and engine and exhaust system provided herein tracks an amount of ammonia stored on a catalyst of the SCR based on a feed-forward calculation of injected urea based on engine out NOx mass flow and reduction efficiency of the SCR catalyst based on a temperature of the SCR catalyst, and operates the engine and exhaust system in a NOx-rich mode in which an EGR fraction command is adjusted, based on the tracked amount of stored ammonia, to decrease an amount of EGR gas entering an intake of the internal combustion engine and thereby reduce ammonia stored on the SCR catalyst.

10 Claims, 4 Drawing Sheets

(56) References Cited

U.S. PATENT DOCUMENTS

| | | |
|---|---|---|
| 6,904,752 B2 | 6/2005 | Foster et al. |
| 7,281,518 B1 | 10/2007 | Allain et al. |
| 7,472,545 B2 | 1/2009 | Hemingway et al. |
| 7,707,824 B2 * | 5/2010 | Solbrig ............... 60/286 |
| 8,393,143 B2 * | 3/2013 | Walz et al. ............... 60/295 |
| 8,454,916 B2 * | 6/2013 | Perrin et al. ............... 423/210 |
| 2003/0140621 A1 | 7/2003 | Khair et al. |
| 2007/0137181 A1 | 6/2007 | Upadhyay et al. |
| 2007/0163244 A1 | 7/2007 | Federle |
| 2007/0193254 A1 | 8/2007 | Johannes |
| 2007/0199320 A1 | 8/2007 | Yager et al. |
| 2007/0227518 A1 | 10/2007 | West et al. |
| 2007/0245714 A1 * | 10/2007 | Frazier et al. ............... 60/276 |
| 2008/0078167 A1 | 4/2008 | Wang et al. |
| 2008/0098725 A1 | 5/2008 | Driscoll et al. |
| 2008/0264036 A1 | 10/2008 | Bellovary |
| 2009/0056315 A1 * | 3/2009 | Solbrig et al. ............... 60/286 |
| 2009/0120068 A1 * | 5/2009 | Sakimoto et al. ............... 60/285 |
| 2009/0158706 A1 * | 6/2009 | Sun ............... 60/274 |
| 2009/0272105 A1 * | 11/2009 | Chi et al. ............... 60/295 |
| 2010/0122524 A1 * | 5/2010 | Solbrig ............... 60/285 |
| 2010/0223908 A1 * | 9/2010 | Solbrig et al. ............... 60/276 |

OTHER PUBLICATIONS

First Office Action for Chinese Patent Application No. 201180005311.1, dated Mar. 27, 2014, 9 pages.

Search Report for Chinese Patent Application No. 201180005311.1, dated Mar. 13, 2014, 2 pages.

* cited by examiner

ENGINE AND EXHAUST AFTERTREATMENT CONTROL

FIELD OF THE INVENTION

The inventions are directed to a system and method for controlling engine exhaust components of an internal combustion engine utilizing an SCR catalyst.

BACKGROUND

Diesel engines use a much leaner air-to-fuel ratio compared with gasoline engines. The larger amount of air in the intake gas promotes more complete fuel combustion and better fuel efficiency, and thus lower emissions of hydrocarbons and carbon monoxide than gasoline engines. However, with the higher pressures and temperatures in the diesel engine, nitrogen oxides emissions, which include nitric oxide (NO) and nitrogen dioxide ($NO_2$) (known collectively as NOx), tend to be higher because the high temperatures cause the oxygen and nitrogen in the intake air to combine as NOx.

NOx cause a number of concerns related to the environment, such as a source of ground-level ozone or smog, acid rain, excess aqueous nutrients, and can readily react with common organic chemicals, and even ozone, to form a wide variety of toxic products. Since the 1970's, government legislation has required increasing reductions of NOx in exhaust gas emissions.

To comply with increasingly stringent government mandates regarding NOx emissions, industry has developed several NOx reduction mechanisms. Two such mechanisms involve manipulation of engine operating characteristics and implementation of after-treatment control technologies.

In general, manipulation of engine operating characteristics to lower NOx emissions can be accomplished by lowering the intake temperature, reducing power output, retarding the injector timing, reducing the coolant temperature, and/or reducing the combustion temperature. For example, cooled exhaust gas recirculation (EGR), in which a percentage of the exhaust gases are drawn or forced back into the intake and mixed with the fresh air and fuel that enters the combustion chamber, is a well known way to lower the peak flame temperatures inside the combustion chamber. Intake air dilution reduces formation of NOx by decreasing the $O_2$ concentration in the combustion process. To a smaller degree, the air also absorbs some heat, further cooling the process. However, use of EGR increases fuel consumption.

After-treatment control technologies that treat post combustion exhaust include selective catalytic reduction (SCR). The SCR process reduces NOx to diatomic nitrogen ($N_2$) and water ($H_2O$) using a catalyst and anhydrous ammonia ($NH_3$) or aqueous $NH_3$, or a precursor that is convertible to $NH_3$, such as urea. Typical SCR catalysts are a honeycomb or plate ceramic carrier (e.g., titanium oxide) and oxides of base metals (e.g., vanadium and tungsten), zeolites and other precious metals.

In addition to NOx emissions, a further disadvantage of diesel engines is the production and emission of exhaust particulate matter (PM), or soot, which is produced comparatively larger amounts than that of gasoline engines. PM is a complex emission that includes elemental carbon, heavy hydrocarbons derived from the fuel, lubricating oil, and hydrated sulfuric acid derived from the fuel sulfur. Diesel PM includes small nuclei mode particles having diameters below 0.4 µm and their agglomerates of diameters up to 1 µm. PM is formed when insufficient air or low combustion temperature prohibits the complete combustion of free carbon. As such, PM is partially unburned fuel or lubrication oil, and is often seen as black smoke.

The fine particles that make up PM emissions in diesel exhaust can penetrate deep into the lungs and pose serious health risks including aggravated asthma, lung damage, and other serious health problems. PM emissions from diesel engines also contribute to haze, which restricts visibility. Due to their damaging effects, governmental agencies have imposed increasingly stringent restrictions for PM emissions.

One after-treatment device used to reduce or remove PM in diesel exhaust is a diesel particle filter (DPF). A DPF system typically includes a filter encased in a canister that is positioned in the diesel exhaust stream. The filter is designed to collect PM while allowing exhaust gases to pass through it. Types of DPFs include ceramic and silicon carbide materials, fiber wound cartridges, knitted fiber silica coils, wire mesh and sintered metals. DPFs have demonstrated reductions in PM by up to 90% or more. DPFs can also be used together with a diesel oxidation catalyst (DOC) to reduce HC, CO and soluble organic fraction (SOF) of PM in diesel exhaust.

While DPFs are very effective in removing PM from diesel exhaust gas, the volume of PM generated by a diesel engine is sufficient to fill up and plug a DPF in a relatively short time. Thus, a process cleaning or replacing the DPF must be periodically performed to allow continued engine operation. One DPF cleaning process known as regeneration burns off or "oxidizes" PM that has accumulated in the filter. However, because diesel exhaust temperatures often are not sufficiently high to burn accumulated PM, various ways to raise the exhaust gas temperature or to lower the oxidation temperature have been utilized.

Regeneration can be accomplished passively by adding a catalyst to the filter. For example, a base or precious metal coating applied to the filter surface can reduce the ignition temperature required for oxidizing accumulated PM. A DOC can be provided upstream of the DPF to oxidize NO to generate $NO_2$ (requiring accurate control to maintain the mass ratio of NO/PM in engine-out exhaust gas), which in turn oxidizes the PM in the downstream DPF. Alternatively, regeneration may be accomplished actively by increasing the exhaust temperature through a variety of approaches, e.g., engine management, a fuel burner, resistive heating coils or late fuel injection. Active systems use pulses of diesel fuel late in the combustion cycle to oxidize across the catalyst thereby heating the DPF and oxidizing trapped PM. However, running the cycle too often while keeping the back pressure in the exhaust system low can result in excess fuel use.

Engine control modules (ECM's) (also known as engine control units (ECU's)), control the engine and other functions in the vehicle. ECM's can receive a variety of inputs to determine how to control the engine and other functions in the vehicle. With regard to NOx and PM reduction, the ECM can manipulate the parameters of engine operation, such as EGR and fuel injection.

ECM's can also control the operating parameters of exhaust after-treatment devices, such as a urea based SCR system, a DOC system, or a DPF system. For instance, an ECM can meter urea solution into the exhaust stream at a rate calculated from an algorithm which estimates the amount of NOx present in the exhaust stream as a function of engine operating conditions, e.g., exhaust flow, temperature and NOx concentration. As a further example, an ECM can monitor one or more sensors that measure back pressure and/or temperature, and based on pre-programmed set points, the ECM can activate a regeneration cycle.

In addition to EGR, designing electronic controls and improving fuel injector systems to deliver fuel at the best combination of injection pressure, injection timing, and spray location allow the engine to burn fuel efficiently without causing temperature spikes that increase NOx emissions. For instance, controlling the timing of the start of injection of fuel into the cylinders impacts emissions as well as fuel efficiency. Advancing the start of injection, so that fuel is injected when the piston is further away from top dead center (TDC), results in higher in-cylinder pressure and higher fuel efficiency, but also results in higher NOx emissions. On the other hand, retarding the start of injection delays combustion, but lowers NOx emissions. Due to the delayed injection, most of the fuel is combusted at lower peak temperatures, reducing NOx formation.

With EGR engines, one of the key components to emissions control is the turbocharger. Most manufacturers using EGR technology have developed versions of variable geometry turbochargers (VGT), which are designed to regulate the flow of cooled exhaust air back into the combustion chamber, depending on the engine's speed. The precise amount of exhaust gas that must be metered into the intake manifold varies with engine load. High EGR flow is generally necessary during cruising and mid-range acceleration, when combustion temperatures are typically very high. On the other hand, low EGR flow is needed during low speed and light load conditions. No EGR flow should occur during conditions when EGR could negatively impact engine operating efficiency or vehicle drivability, e.g. during engine warm up, idle, or wide open throttle.

Reducing NOx by manipulating engine operation generally reduces fuel efficiency. Emissions target for lower NOx have put a lot of emphasis on reduced engine out NOx to enable meeting the stringent tailpipe out NOx levels to be compliant. In doing so, many levers like charge flow, EGR flow, injection timing have been changed with the aim of reducing NOx, but on the flip side it has lowered BSFC.

Moreover, mere manipulation of engine operation may not sufficiently reduce the amount of NOx to mandated levels. As a result, after-treatment systems, such as those utilizing SCR, DOC and/or DPF elements as described above also need to be implemented. Fuel efficiency benefits of 3 to 10% can result from using SCR systems to reduce NOx rather than manipulating engine operation for NOx reduction, which negatively impacts fuel efficiency.

Urea-based SCR systems can be viewed according to four major subsystems: the injection subsystem that introduces urea into the exhaust stream, the urea vaporization and mixing subsystem, the exhaust pipe subsystem, and the catalyst subsystem. A diesel vehicle must carry a supply of urea solution for the SCR system, typically 32.5% urea in water by weight. The urea solution is pumped from the tank and sprayed through an atomizing nozzle into the exhaust gas stream. Complete mixing of urea with exhaust gases and uniform flow distribution are critical in achieving high NOx reductions. Urea-based SCR systems use gaseous ammonia to reduce NOx. During thermolysis, the heat of the gas breaks the urea ($CO(NH_2)_2$) down into ammonia ($NH_3$) and hydrocyanic acid (HCNO). The ammonia and the HCNO then meet the SCR catalyst where the ammonia is absorbed and the HCNO is further decomposed through hydrolysis into ammonia. Alternatively, anhydrous $NH_3$ or aqueous $NH_3$ may be used as the SCR ammonia source. Regardless of the $NH_3$ source for the SCR system, when the $NH_3$ is absorbed, it reacts with the NOx to produce water, oxygen gas ($O_2$), and nitrogen gas ($N_2$).

The amount of ammonia injected into the exhaust stream is a critical operating parameter. The required ratio of ammonia to NOx is typically stoichiometric and must be maintained to assure high levels of NOx reduction. However, the SCR system can never achieve 100% NOx reduction due to imperfect mixing, etc.

SUMMARY

The inventions relate to improving fuel economy and/or performance of an internal combustion engine by utilizing a margin between actual real time SCR catalyst efficiency and a target efficiency needed to meet an emissions target.

In an embodiment consistent with the claimed invention, a method of controlling a internal combustion engine and exhaust system having an SCR, includes monitoring, in real time, NOx conversion efficiency of a the exhaust flow output by the internal combustion engine through the SCR. The monitored NOx conversion efficiency is compared with a predetermined target conversion efficiency to determine whether it exceeds the predetermined target conversion efficiency. The predetermined target efficiency can be based on a predetermined allowable amount of NOx emission. While the monitored NOx conversion efficiency exceeds the predetermined amount, the NOx concentration in the exhaust flow is increased by an amount based on the difference in the monitored conversion efficiency and the predetermined target conversion efficiency.

In another embodiment consistent with the claimed invention, a controller for an internal combustion engine and exhaust system having an SCR includes a monitor module adapted to monitor, in real time, NOx conversion efficiency of an exhaust flow output by the internal combustion engine through the SCR. The controller also includes a comparing module adapted to determine, using a processor associated with the controller, whether the monitored NOx conversion efficiency exceeds a predetermined target conversion efficiency. The target conversion efficiency is based on a predetermined allowable amount of NOx emission. The controller includes a control module adapted increase the NOx concentration level in the exhaust flow by an amount based on the difference in the monitored conversion efficiency and the predetermined target conversion efficiency, while the monitored NOx conversion efficiency exceeds the predetermined amount.

By increasing the NOx mass flow in the exhaust, for example, by way of decreasing EGR flow or other engine management measure, the brake specific fuel consumption can be improved. Additionally, the increased NOx flow can reduce an amount of particulate matter (PM) in a particulate filter via promotion of oxidation of the PM, which also can improve fuel economy.

In another embodiment consistent with the claim invention, a method of controlling a internal combustion engine and exhaust system having an SCR includes tracking an amount of ammonia stored on a catalyst of the SCR based on a feed-forward calculation of injected urea based on engine out NOx mass flow, and reduction efficiency of the SCR catalyst based on a temperature. The engine and exhaust system are operated in a NOx-rich mode in which an EGR fraction command is adjusted, based on the tracked amount of stored ammonia, to decrease an amount of EGR gas entering an intake of the internal combustion engine and thereby reduce ammonia stored on the SCR catalyst.

In yet another embodiment consistent with the claimed invention, a controller for an internal combustion engine and exhaust system having an SCR includes a tracking module adapted to track an amount of ammonia stored on a catalyst of the SCR based on a feed-forward calculation of injected urea based on engine out NOx mass flow and reduction efficiency of the SCR catalyst based on a temperature. The controller also includes a control module adapted to operate the engine and exhaust system in an NOx-rich mode in which an EGR fraction command is adjusted, based on the tracked amount of stored ammonia, to decrease an amount of EGR gas entering an intake of the internal combustion engine and thereby reduce ammonia stored on the SCR catalyst.

Entering a NOx-rich operating mode allows for better performance and/or particulate filter regeneration without the fuel penalty that accompanies active regeneration events.

Other features, elements, characteristics and advantages of the present invention will become more apparent from the following detailed description of exemplary embodiments of the present invention with reference to the attached drawings.

DETAILED DESCRIPTION

The inventor has realized that under certain operating conditions, such as on the road driving duty cycles (e.g., heavy load, line haul, RV etc.), the exhaust and flow levels through the SCR are such that conversion efficiencies are beyond what is needed to meet emission targets, so injected ammonia becomes stored on the surface of the SCR catalyst and would be available to be consumed by NOx. For example, under such operating conditions, SCR conversion efficiency can approach about 95%, but current legislated emission targets would require only about 75% cycle conversion efficiency. In these conditions, there is a margin or "reserve" amount of efficiency that can be traded off for improved performance.

Figure 1:
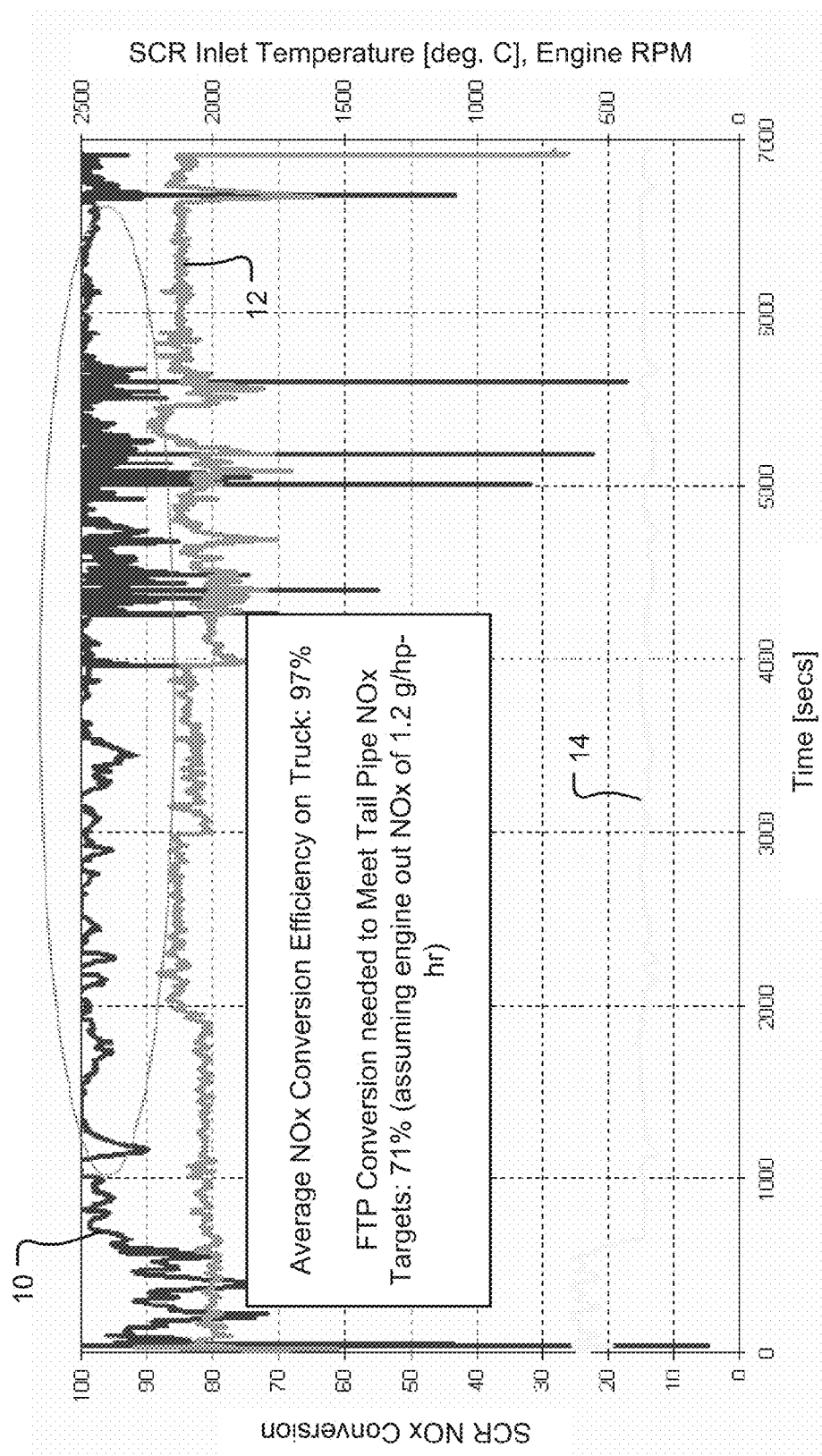
FIG. 1 is a graph showing an example of actual SCR NOx conversion efficiency for truck on a highway.

FIG. 1 shows an example of SCR performance for truck on a highway. The conversion efficiency is shown in curve 10, engine speed (RPM) in curve 12, and the SCR inlet temperature in curve 14. As can be seen, the truck achieves an average of 97% NOx conversion efficiency, but the target NOx requires only 71% conversion efficiency. Embodiments in accordance with the claimed invention convert the reserve allowed by the high SCR efficiency into better engine economy and/or performance by switching to an operating mode that can improve brake specific fuel consumption (BSFC) and involves controlling any one of, or combination of: lowering EGR flow, advancing timing, increasing rail pressure, urea (DEF) dosing quantity, and pilot and post fueling quantities. These and other engine parameters can be modified to improve BSFC, but would also increase engine-out NOx. The additional performance of the SCR present in the reserve will be available to reduce the added NOx to ensure emission compliance.

Figure 2:
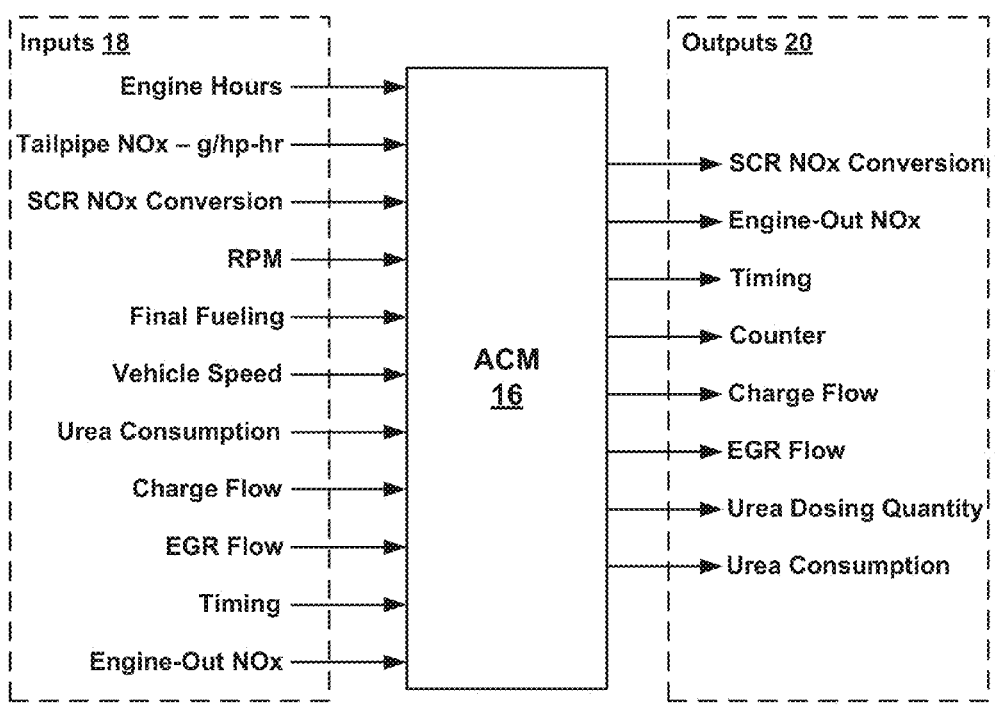
FIG. 2 is a diagram of an adaptive control module (ACM) in accordance with an exemplary embodiment.

FIG. 2 shows an exemplary embodiment of an adaptive control module (ACM) 16, which can be implemented in the ECM/ECU or as a separate module to monitor in real-time various inputs 18 shown schematically as entering from the left of the depicted ACM 16, and modified outputs 20 exiting the right side of the depicted ACM 16. By "real-time," a sample rate sufficient to achieve acceptable improvements in fuel economy and/or performance can be as small as 1 Hz or smaller, but greater rates of sampling of one or more of the sensed conditions of FIG. 2 can provide greater efficiencies during times of rapidly changing conditions. The ACM can include one or more microprocessors executing code that carries out instructions stored in memory contained therein or in one or more memory devices which store data and program instructions accessible to the ACM 16. The ACM 16 generally receives input signals from various sensors throughout the vehicle as well as possible external input data from end users. To perform the monitoring and calculations described herein in real-time, the signals must be sampled at a rate adequate to provide the data for the stored ammonia and conversion efficiency calculations. The ACM 16 then reads the program instructions and executes the instructions to perform data monitoring and control functions in accordance with the input signals. The ACM 16 sends control data to an output port of the ACM 16 which relays output signals to a variety of actuators controlling the engine or the SCR system.

SCR Conversion efficiency (i.e., "SCR NOx Conversion") is monitored in "real-time" to obtain the amount of stored $NH_3$ in the SCR catalyst by monitoring/measuring SCR inlet/outlet NOx. This can be carried out using two NOx sensors to measure conversion efficiencies across the SCR, although another way to measure stored $NH_3$ can be used, such as a $NH_3$ sensor provided at the outlet of the SCR.

In an embodiment, a control feature provides a way to take advantage of a performance margin available from an improved SCR conversion efficiency at certain operating conditions by optimizing engine conditions to increase or maximize fuel economy. In addition to providing a way to improve fuel economy, an embodiment can make use of opportunistic passive DPF regeneration using engine out NOx. Higher NOx can be achieved by running the engine in a mode in which EGR is reduced or cut off (e.g., Chi4 mode) and by detecting an amount of ammonia stored in the SCR catalyst that would be needed to consume the same and avoid NOx penalty.

The injected $NH_3$ under certain conditions gets stored on the SCR surface and would be available to be consumed by NOx. However, NOx also can be released from the SCR catalyst surface at high temperature. This release should to be avoided or minimized using a closed loop controls strategy that balances the EGR fraction in the charge air to vary engine out NOx, such that there is high enough NOx concentration to consume stored $NH_3$ in the SCR and to clean the DPF.

Embodiments consistent with the claimed invention can provide a benefit of switching to a mode that improves BSFC (e.g., by lower EGR flow, advanced timing, rail pressure) while also not increasing tailpipe NOx emissions because the SCR operation is more efficient. This also can help with lowering engine out particulate matter, and the increased engine out NOx can help in soot oxidation, thereby keeping the DPF clean. Accordingly, desoot intervals can be increased, thus adding another factor that can improve fuel economy.

Figure 3:
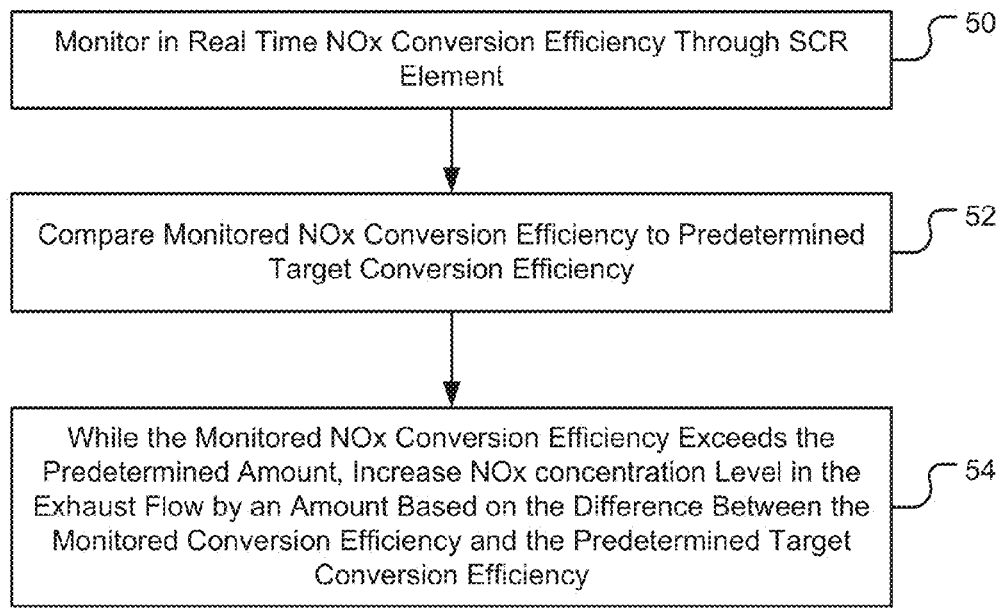
FIG. 3 is a process flow related controlling an engine and exhaust system based on an actual SCR conversion margin determined in real time and a predetermined target conversion efficiency according to an exemplary embodiment.

FIG. 3 shows a process flow according to an exemplary embodiment that controls an internal combustion engine based on an efficiency margin existing between the actual NOx conversion efficiency and a conversion efficiency needed to meet a tail pipe NOx target, such as an emissions requirement. Starting at process 50, the real time NOx conversion efficiency through an SCR element is monitored. Next, process 52 compares compare the monitored NOx conversion efficiency to a predetermined target conversion efficiency. For example, the predetermined target conversion efficiency can be a value in a look up table or calculated value based on a maximum acceptable tailpipe emissions level. In process 54, while the monitored NOx conversion efficiency exceeds the predetermined amount, the NOx concentration level in the engine-out exhaust flow is increased by an amount based on the difference between the monitored conversion efficiency and the predetermined target conversion efficiency.

According to another embodiment, a closed loop control strategy that improves fuel economy with opportunistic DPF regeneration using engine out NOx tracks $NH_3$ stored on the SCR catalyst, as well as soot trapped in the DPF, on a real-time basis. This can be carried out via a feed-forward calculation of injected urea based on engine-out NOx, and reduction efficiency of the SCR catalyst based on temperature. The feed forward calculation can be carried out, for example, using a model based on reactor data that uses the inputs of time, temperature, exhaust flow, urea dosed, SCR inlet NOx concentration, and catalyst properties to determine the real-time storage and release of $NH_3$.

Figure 4:
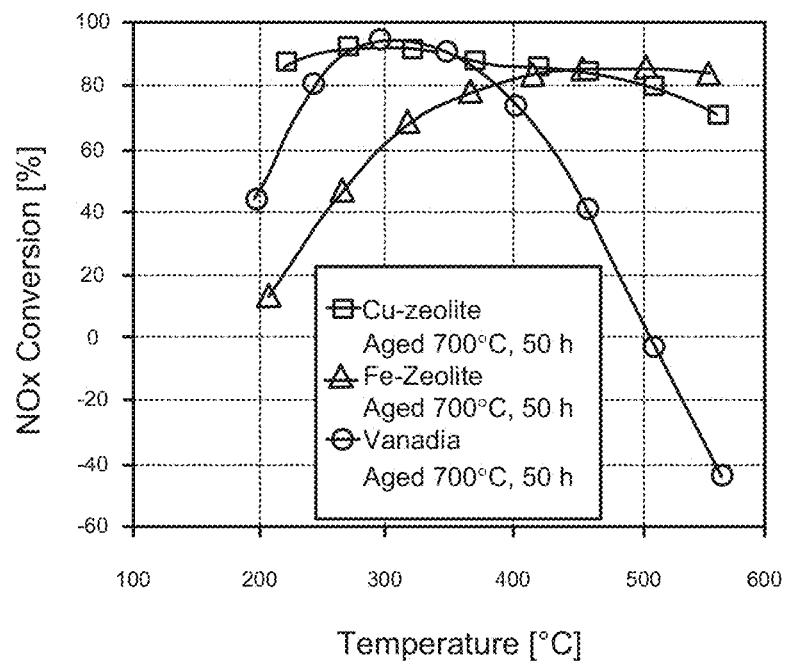
FIG. 4 is a graph depicting the characteristics related to temperature dependence of NOx conversion efficiency for various catalyst materials.
Figure 5:
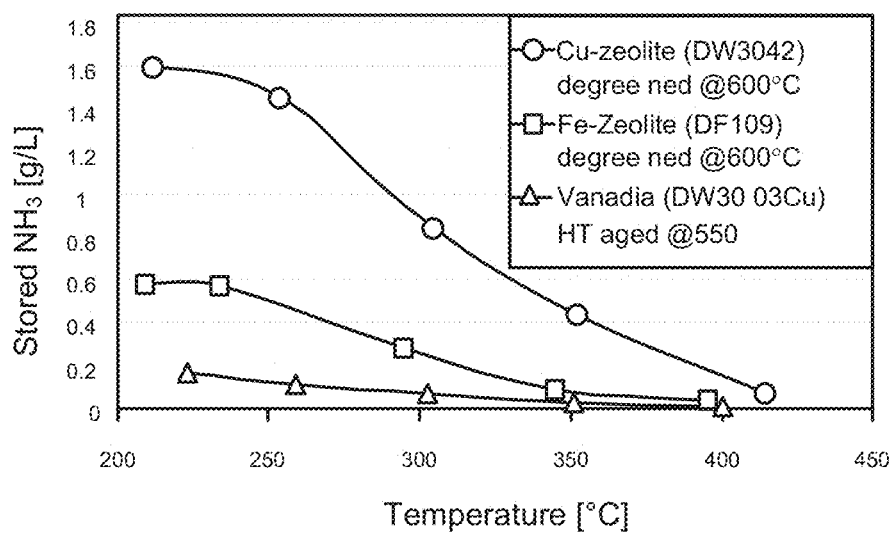
FIG. 5 is a graph depicting the characteristics related to ammonia storage on various SCR catalyst materials.

FIG. 4 shows characteristics related to temperature dependence of NOx conversion efficiency on examples of vandia, FeZ and CuZ SCR catalysts. As can be seen, FeZ generally offers higher temperature related performance compared with CuZ or vanadia-based catalysts, whereas CuZ can offer comparatively better low temperature performance. CuZ is also less sensitive to inlet NO2/NOx and allows urea dosing at ANR (ammonia-to-NOx NOx ratio)>1 for improved high temperature efficiency, even above that of FeZ. FIG. 5 shows that $NH_3$ storage generally decreases with increase in catalyst temperature. As shown in FIG. 5, the zeolite catalysts can store more NH3 at low temperature than the vanadia-based catalyst. At low temperature duty cycles, an amount of stored $NH_3$ on the SCR catalyst can be sufficient for reducing some NOx without urea (or other NH3 source) dosing. Using such characteristic data, an accurate model can be created for a feed-forward calculation.

A control loop for improving fuel economy with opportunistic DPF regeneration using engine-out NOx does two things: (1) varies the EGR fraction command (i.e., the reference value for the EGR closed loop control system) and provides NOx-rich exhaust to clean the SCR of stored ammonia as well as maintain legislative limits of NH3 slippage past the SCR and into the atmosphere, and (2) enters Chi4 mode (i.e., EGR valve closed—high NOx) to present conditions allowing DPF regenerations when the conditions exist (i.e., detected loaded filter+high NH3 storage on SCR). For example, if an opportunity arises where there is enough stored ammonia on the SCR catalyst, and a sensed delta-pressure across the DPF indicates trapped particulate matter needs to be cleaned from the filter, the EGR valve can be closed to increase an amount of engine-out NOx to almost three times the normal value. The higher engine-out NOx can easily clean the soot-clogged DPF in about 20 to 30 minutes of operation while remaining emissions compliant because the stored ammonia in the SCR can reduce the increased in NOx, thus cleaning up the excess $NH_3$ stored in the SCR catalyst. Hence, the increased engine-out NOx reduces or eliminates potential $NH_3$ slip under transient excess ammonia storage conditions.

An embodiment of this strategy improves fuel economy and takes advantage of an opportunity for passive DPF regeneration to avoid the fuel penalty of going into active regeneration. As a result, active regeneration involving dosing diesel fuel, such as spraying fuel directly into the exhaust stream or injecting as extra fuel in the engine cylinders to raise exhaust gas temperatures can be avoided. This strategy will be particularly advantageous in stop-and-go duty cycles where the exhaust temperatures and flow prevent periodic active regenerations. An embodiment can include reduced EGR (e.g., Chi4 mode) during times of regeneration and running "minimal EGR" at other opportunistic times. "Minimal EGR" is an amount of EGR that would produce NOx at levels that can be adsorbed by ammonia stored on the SCR catalyst and not exceed the tailpipe-out emission thresholds. Embodiments implementing NOx-rich exhaust to clean the DPF can include an ACM module, such as the ACM module 16 of FIG. 2, with an added input function of determining whether the DPF should be cleaned (e.g., a measured delta-pressure value above a predetermined threshold value) and can be implemented with less or more functionality than that described above.

Figure 6:
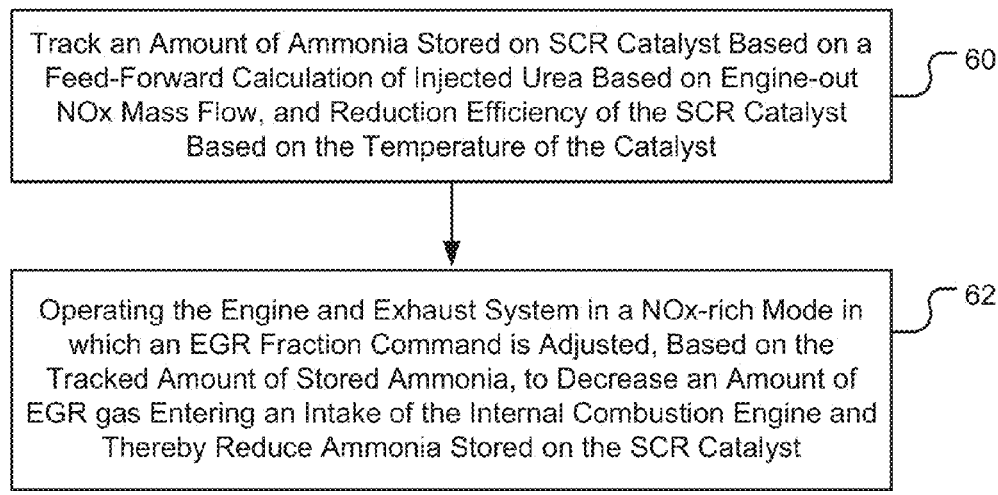
FIG. 6 is a process flow related to controlling an engine and exhaust system based on tracking an amount of ammonia stored on an SCR catalyst according to an exemplary embodiment.

FIG. 6 shows a process flow according to an exemplary embodiment that controls an internal combustion engine based on an amount of ammonia stored in the SCR catalyst. Starting at process 60, the an amount of ammonia stored on an SCR catalyst is tracked based on a feed-forward calculation of injected urea based on engine-out NOx mass glow, and reduction efficiency of the SCR catalyst based on the temperature of the SCR catalyst. In process 62, the engine and exhaust system are operated in a NOx-rich mode in which an EGR fraction command is adjusted, based on the tracked amount of stored ammonia, to decrease an amount of EGR gas entering an intake of the internal combustion engine and thereby reduce ammonia stored on the SCR catalyst.

Although a limited number of embodiments is described herein, one of ordinary skill in the art will readily recognize that there could be variations to any of these embodiments and those variations would be within the scope of the appended claims. Thus, it will be apparent to those skilled in the art that various changes and modifications can be made to the engine and exhaust after-treatment control described herein without departing from the scope of the appended claims and their equivalents.

What is claimed is:

1. A method of controlling an internal combustion engine and exhaust system including an SCR, comprising:
    monitoring a filter element in the path of the exhaust gas flow to detect an obstruction in the exhaust gas flow;
    determining, in real time, a NOx conversion efficiency of an exhaust flow output by the internal combustion engine through the SCR, the determining of the NOx conversion efficiency based, at least in part, on received data from a sensor downstream of the SCR at a predetermined sample rate during operation of the internal combustion engine;
    determining, using a processor, an excess efficiency margin based on a difference between the determined NOx conversion efficiency and a predetermined target conversion efficiency, said target conversion efficiency based on a predetermined allowable amount of NOx emission; and
    responsive to the determined excess efficiency margin, increasing a NOx concentration level in the exhaust flow by an amount based on the determined excess efficiency margin by decreasing an EGR flow rate to regenerate the filter element.

2. The method according to claim 1, wherein determining said NOx conversion efficiency includes a step of measuring a characteristic of the exhaust flow that is indicative of an amount of ammonia stored on a catalyst of the SCR.

3. A method of controlling an internal combustion engine and exhaust system including an SCR, comprising:
tracking an amount of ammonia stored on a catalyst of the SCR based on a feed-forward calculation of injected urea based on engine out NOx mass flow and reduction efficiency of the SCR catalyst based on a temperature of the SCR catalyst;
monitoring a particle filter element in the path of the exhaust gas flow to detect an obstruction in the exhaust gas flow based on a measured pressure differential;
determining an excess efficiency margin based on the tracked amount of ammonia stored on the catalyst of the SCR and a predetermined target conversion efficiency; and
modifying an EGR fraction command to decrease an amount of EGR gas entering an intake of the internal combustion engine to regenerate the particle filter element without injecting fuel into the exhaust system, the EGR fraction command modified in response to the excess efficiency margin exceeding a first value and the measured pressure differential exceeding a second value.

4. The method according to claim 3, wherein modifying of the EGR fraction command causes the NOx concentration in the exhaust output from the engine to limit ammonia slip past the SCR to an amount equal to or less than a permitted ammonia slip amount during regeneration of the particle filter element.

5. The method according to claim 3, wherein modifying of the EGR fraction command comprises entering an operating mode in which gas flow from the EGR is prevented from entering an intake of the internal combustion engine.

6. A controller for an internal combustion engine and exhaust system including an SCR, comprising:
a monitor module adapted to monitor, in real time, NOx conversion efficiency of an exhaust flow output by the internal combustion engine through the SCR and a filter element in the path of the exhaust gas flow to detect an obstruction in the exhaust gas flow, the monitoring of the NOx conversion efficiency by the monitor module based, at least in part, on received data from a sensor downstream of the SCR at a predetermined sample rate during operation of the internal combustion engine;
a comparing module adapted to determine, using a processor associated with the controller, an excess efficiency margin based on a difference between the monitored NOx conversion efficiency and a predetermined target conversion efficiency, said target conversion efficiency based on an predetermined allowable amount of NOx emission; and
a control module adapted to increase the NOx concentration level in the exhaust flow by decreasing an EGR flow rate by an amount based on the excess efficiency margin to regenerate the filter element.

7. The controller according to claim 6, wherein the monitor module is further adapted to measure a characteristic of the exhaust flow that is indicative of an amount of ammonia stored on a catalyst of the SCR.

8. A controller for an internal combustion engine and exhaust system including an SCR, comprising:
a tracking module adapted to track an amount of ammonia stored on a catalyst of the SCR based on a feed-forward calculation of injected urea based on engine out NOx mass flow and reduction efficiency of the SCR catalyst based on a temperature;
an exhaust flow pressure sensor for monitoring exhaust flow through a particle filter element to detect an obstruction in the exhaust gas flow; and
a control module adapted to:
determine an excess efficiency margin based on the tracked amount of ammonia stored on the catalyst of the SCR and a predetermined target conversion efficiency, and
modify an EGR fraction command to decrease an amount of EGR gas entering an intake of the internal combustion engine to regenerate the particle filter element and thereby reduce ammonia stored on the SCR catalyst without injecting fuel into the exhaust system, the EGR fraction command modified by the control module in response to the excess efficiency margin exceeding a first value and a pressure differential measured by the exhaust flow pressure sensor exceeding a second value.

9. The controller according to claim 8, wherein the control module is adapted to modify the EGR fraction command to cause the NOx concentration in the exhaust output from the engine to limit ammonia slip past the SCR to an amount equal to or less than a permitted ammonia slip amount during regeneration of the particle filter element.

10. The controller according to claim 8, wherein the control module is adapted to adjust the EGR fraction by preventing EGR gas flow from entering an intake of the internal combustion engine.

* * * * *